US011934138B2

(12) United States Patent
Kawarago

(10) Patent No.: US 11,934,138 B2
(45) Date of Patent: Mar. 19, 2024

(54) CLEANING APPARATUS FOR CLEANING AN ELEMENT THAT BEARS A TONER IMAGE AND IMAGE FORMING APPARATUS HAVING THE CLEANING APPARATUS

(71) Applicant: CANON KABUSHIKI KAISHA, Tokyo (JP)

(72) Inventor: Atsushi Kawarago, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/960,174

(22) Filed: Oct. 5, 2022

(65) Prior Publication Data

US 2023/0123409 A1 Apr. 20, 2023

(30) Foreign Application Priority Data

Oct. 18, 2021 (JP) ................................ 2021-170001

(51) Int. Cl.
*G03G 21/00* (2006.01)
*G03G 15/01* (2006.01)
(Continued)

(52) U.S. Cl.
CPC ..... *G03G 21/0029* (2013.01); *G03G 15/0189* (2013.01); *G03G 15/161* (2013.01);
(Continued)

(58) Field of Classification Search
CPC ............. G03G 15/0189; G03G 15/161; G03G 21/0011; G03G 21/0017; G03G 21/0029; G03G 21/1619; G03G 21/168; G03G 21/169; G03G 21/1821; G03G 21/1825; G03G 2215/1647; G03G 2215/1661; G03G 2221/0089; G03G 2221/1618;
(Continued)

(56) References Cited

U.S. PATENT DOCUMENTS

| | | | | |
|---|---|---|---|---|
| 9,014,612 B2 | 4/2015 | Matsumura | | |
| 2010/0061780 A1* | 3/2010 | Sugiyama | .......... G03G 21/0029 | 399/350 |

FOREIGN PATENT DOCUMENTS

| | | |
|---|---|---|
| JP | H11202713 A | 7/1999 |
| JP | 2001331070 A | 11/2001 |

(Continued)

*Primary Examiner* — Joseph S Wong
(74) *Attorney, Agent, or Firm* — ROSSI, KIMMS & McDOWELL LLP

(57) ABSTRACT

A cleaning apparatus includes an endless belt configured to bear a toner image, a rotary member configured to be wound around by the belt, and configured to rotate integrally with the belt, a bearing configured to rotatably support the rotary member, a cleaning unit configured to come into contact with a surface of the belt and collect an adhering matter adhered onto the surface, an urging member configured to urge the cleaning unit toward the surface of the belt, and a support member configured from a single member and including a first supporting portion, a second supporting portion, and a third supporting portion. The first supporting portion rotatably supports the belt via the bearing and the rotary member. The second supporting portion pivotably supports the cleaning unit. The third supporting portion supports the urging member.

20 Claims, 3 Drawing Sheets

(51) Int. Cl.
*G03G 15/16* (2006.01)
*G03G 21/16* (2006.01)
*G03G 21/18* (2006.01)

(52) U.S. Cl.
CPC ..... *G03G 21/0011* (2013.01); *G03G 21/0017* (2013.01); *G03G 21/1619* (2013.01); *G03G 21/168* (2013.01); *G03G 21/169* (2013.01); *G03G 21/1821* (2013.01); *G03G 21/1825* (2013.01); *G03G 2215/1647* (2013.01); *G03G 2215/1661* (2013.01); *G03G 2221/0005* (2013.01); *G03G 2221/0089* (2013.01); *G03G 2221/1618* (2013.01); *G03G 2221/1642* (2013.01); *G03G 2221/1651* (2013.01); *G03G 2221/1678* (2013.01)

(58) Field of Classification Search
CPC ... G03G 2221/1642; G03G 2221/1651; G03G 2221/1678; G03G 2221/0005
See application file for complete search history.

(56) References Cited

FOREIGN PATENT DOCUMENTS

| | | | |
|---|---|---|---|
| JP | 2011203507 | A | 10/2011 |
| JP | 2013152342 | A | 8/2013 |

* cited by examiner

CLEANING APPARATUS FOR CLEANING AN ELEMENT THAT BEARS A TONER IMAGE AND IMAGE FORMING APPARATUS HAVING THE CLEANING APPARATUS

BACKGROUND OF THE INVENTION

Field of the Invention

This disclosure relates to a cleaning apparatus cleaning an image bearing member, and an image forming apparatus including the same.

Description of the Related Art

Generally, in an image forming apparatus of an electrophotographic system, an apparatus which primarily transfers a toner image from a photosensitive drum onto an intermediate transfer belt and secondarily transfers the toner image from the intermediate transfer belt onto a sheet is known. At the time of this transfer, a small amount of toner remains on the photosensitive drum and the intermediate transfer belt.

Japanese Patent Laid-Open No. 2013-152342 suggests an image forming apparatus which includes a cleaning apparatus cleaning the toner remaining on the photosensitive drum. This cleaning apparatus includes a cleaning blade coming into contact with the photosensitive drum and cleaning the toner on the photosensitive drum, a holding sheet metal holding the cleaning blade, and a compression coil spring urging the cleaning blade toward the photosensitive drum. The compression coil spring is disposed between a cleaning container for storing the toner collected by the cleaning blade and the holding sheet metal.

However, in the image forming apparatus described in Japanese Patent Laid-Open No. 2013-152342, relative positional variations among the photosensitive drum, the cleaning blade, the holding sheet metal, and the compression coil spring occur, and there is a fear that the cleaning performance of the cleaning apparatus may decrease.

SUMMARY OF THE INVENTION

According to a first aspect of the present invention, a cleaning apparatus includes an endless belt configured to bear a toner image, a rotary member configured to be wound around by the belt, and configured to rotate integrally with the belt, a bearing configured to rotatably support the rotary member, a cleaning unit configured to come into contact with a surface of the belt and collect an adhering matter adhered onto the surface, an urging member configured to urge the cleaning unit toward the surface of the belt, and a support member configured from a single member and including a first supporting portion, a second supporting portion, and a third supporting portion. The first supporting portion rotatably supports the belt via the bearing and the rotary member. The second supporting portion pivotably supports the cleaning unit. The third supporting portion supports the urging member.

According to a second aspect of the present invention, a cleaning apparatus includes an image bearing member configured to bear a toner image, a cleaning unit configured to come into contact with a surface of the image bearing member and collect an adhering matter adhered onto the surface, an urging member configured to urge the cleaning unit toward the surface of the image bearing member, and a support member configured from a single member and including a first supporting portion, a second supporting portion, and a third supporting portion. The first supporting portion rotatably supports the image bearing member. The second supporting portion pivotably supports the cleaning unit. The third supporting portion supports the urging member.

Further features of the present invention will become apparent from the following description of exemplary embodiments with reference to the attached drawings.

DESCRIPTION OF THE EMBODIMENTS

With reference to the attached drawings, exemplary embodiments for implementing this disclosure will be described in detail. However, sizes, materials, shapes, relative arrangements, and the likes of components described in the embodiments may be changed from time to time depending on a configuration and conditions of an apparatus to which this disclosure is applied, and the scope of this disclosure is not construed as limited to the embodiments described below.

General Arrangement

Figure 1:
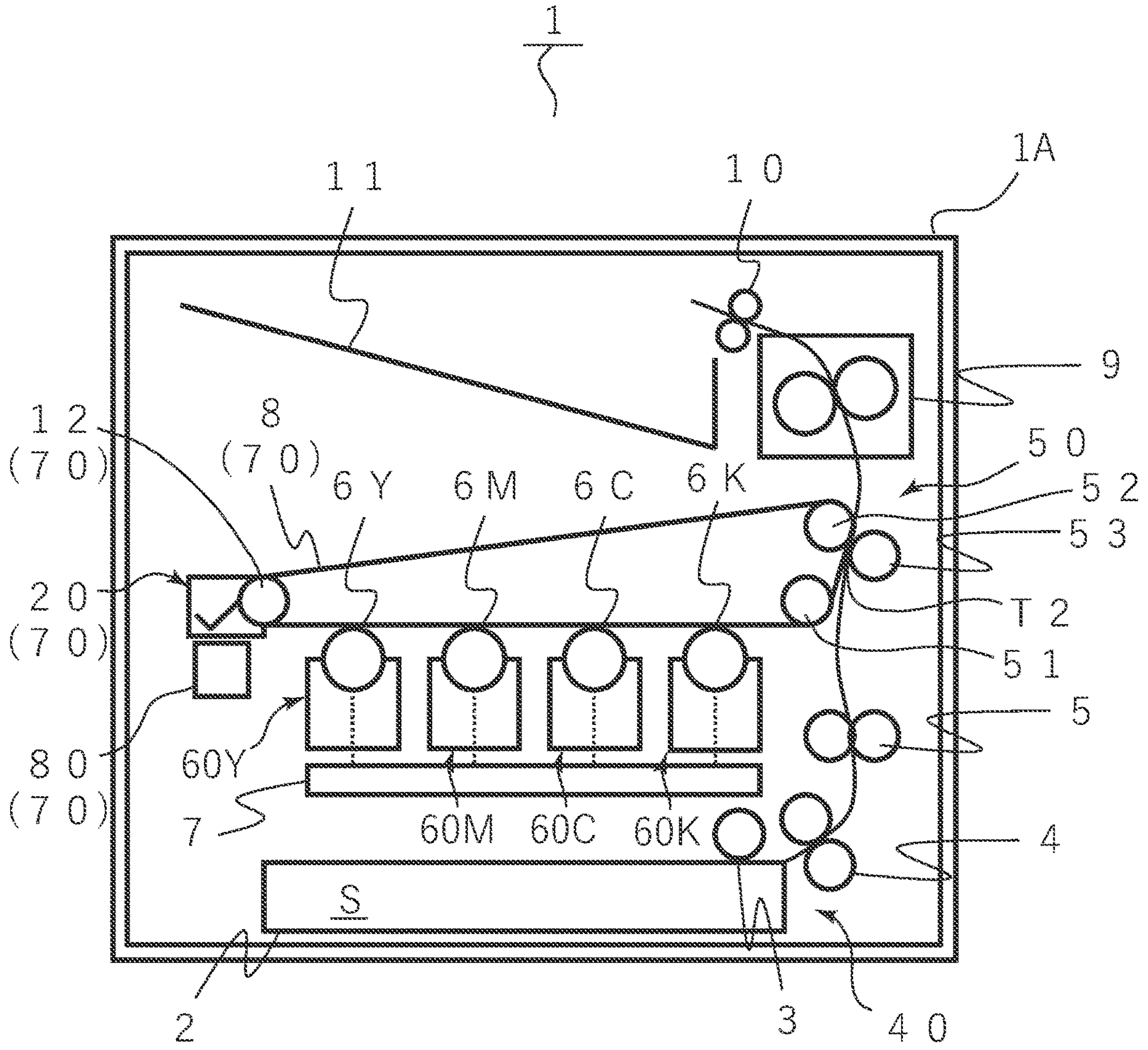
FIG. 1 is an entire schematic diagram showing a printer relating to this embodiment.

A printer 1 which is an image forming apparatus relating to this embodiment is a full color laser beam printer of an electrophotographic system. As shown in FIG. 1, the printer 1 includes a sheet feeding unit 40 feeding a sheet and an image forming unit 50 forming an image on the sheet S fed by the sheet feeding unit 40. Further, the printer 1 includes a fixing unit 9 fixing the image formed by the image forming unit 50 on the sheet and a sheet discharge roller pair 10 discharging the sheet outside of the apparatus. To be noted, it is acceptable to dispose, as an option, a document reading apparatus reading the image of a document at the top of the printer 1. Further, the sheet S used in this embodiment includes paper such as standard paper and an envelope, a plastic film for an overhead projector, and cloth.

When a command to form the image is output to the printer 1, the image forming unit 50 starts an image forming process based on the image information input from the document reading apparatus, an external computer coupled to the printer 1, or the like. The image forming unit 50 includes a laser scanner 7, four process cartridges 60Y, 60M, 60C, and 60K respectively forming images of four colors, yellow (Y), magenta (M), cyan (C), and black (K), and a cleaning apparatus 70. To be noted, since the four process cartridges 60Y, 60M, 60C, and 60K are the same in a configuration except for a difference in a color for forming the image, only the image forming process of the process cartridge 60Y will be described, and the descriptions of the image forming processes of the process cartridges 60M, 60C, and 60K will be omitted herein.

The laser scanner 7 irradiates a laser beam toward a photosensitive drum 6Y of the process cartridge 60Y based on the input image information. At this time, the photosensitive drum 6Y is charged by a charge roller, not shown, beforehand, and an electrostatic latent image is formed on the photosensitive drum 6Y by the laser beam L irradiated from the laser scanner 7. Thereafter, the electrostatic latent image is developed by a developing roller, not shown, and a toner image of yellow (Y) is formed on the photosensitive drum 6Y.

Similarly, toner images of magenta (M), cyan (C), and black (K) are formed on photosensitive drums of the respective process cartridges 60M, 60C, and 60K. The toner images formed on the respective photosensitive drums are transferred onto an intermediate transfer belt 8 by primary transfer rollers, not shown. The intermediate transfer belt 8, serving as an image bearing member bearing the toner image, is an endless belt, and is wound around a stretching roller 12, a tension roller 51, and a secondary transfer inner roller 52. Then, the toner images of the respective colors transferred onto the intermediate transfer belt 8 are conveyed to a secondary transfer roller 53 by the rotation of the intermediate transfer belt 8. The secondary transfer roller 53 and the secondary transfer inner roller 52 form a secondary transfer nip T2 via the intermediate transfer belt 8. To be noted, the image forming process of each color is performed at the timing so as to superimpose the toner image on an upstream toner image primarily transferred onto the intermediate transfer belt 8.

In parallel with the image forming process described above, the sheet S is fed by the sheet feeding unit 40. The sheet feeding unit 40 includes a cassette 2 withdrawable from and attachable to a printer body 1A and a pickup roller 3 feeding the sheet S stacked on the cassette 2. The sheet S is fed by the pickup roller 3, and is separated into one sheet at a time by a separation roller pair 4. The sheet S separated into one sheet at a time by the separation roller pair 4 is conveyed by a registration roller pair 5 at the timing so as to be aligned with the toner image on the intermediate transfer belt 8.

By applying a transfer bias to the secondary transfer roller 53, serving as a transfer unit, the toner image on the intermediate transfer belt 8 is transferred onto the sheet S in the secondary transfer nip T2. The adhering matter such as the toner remaining on the intermediate transfer belt 8 after transferring the toner image onto the sheet S is collected by a cleaning unit 20 of the cleaning apparatus 70. The adhering matter collected by the cleaning unit 20 is stored in a collection container 80.

The fixing unit 9 applies heat and pressure to the sheet S onto which the toner image has been transferred, and the toner is melted and fixed. The sheet S passed through the fixing unit 9 is discharged to a sheet discharge tray 11 formed on an upper surface of the printer 1 by the sheet discharge roller pair 10.

Cleaning Apparatus

Figure 2:
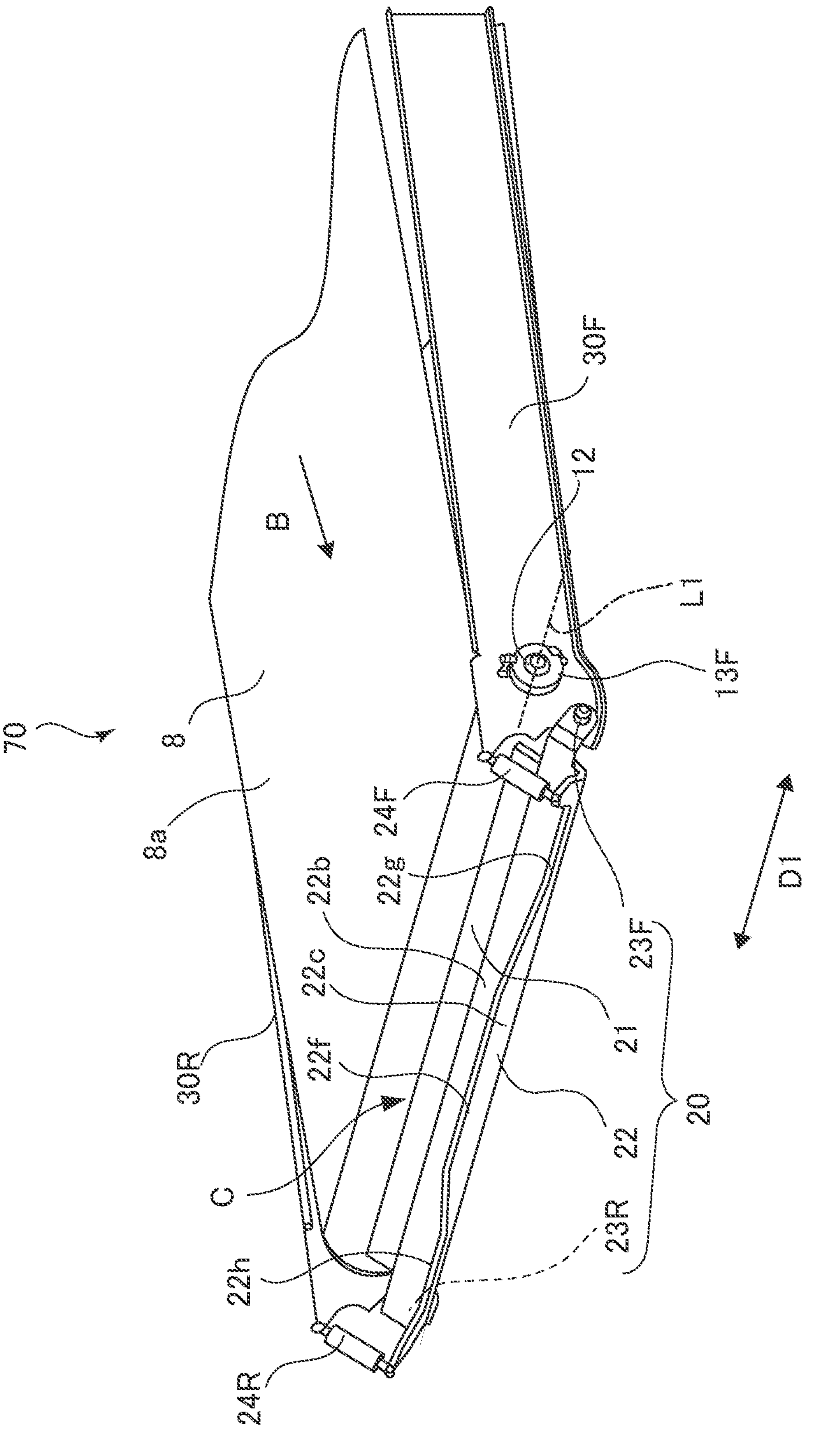
FIG. 2 is a perspective view showing a cleaning apparatus.

Next, the cleaning apparatus 70 will be described in detail. As shown in FIG. 2, the cleaning apparatus 70 includes holding sheet metals 30F and 30R supported by the printer body 1A (refer to FIG. 1), the cleaning unit 20, pressure springs 24F and 24R, the stretching roller 12, the intermediate transfer belt 8, and the collection container 80 (refer to FIG. 1). The holding sheet metals 30F and 30R are formed by press working a sheet metal made of a metallic material.

To be noted, in the following, when a front direction and a back direction of a paper surface in FIG. 1 are respectively referred to as "front" and "rear", in a case where "F" or "R" is put in a reference character of a member, one member is disposed in each of the front and back directions of the cleaning apparatus 70. Then, a member having "F" put in a reference character is the member disposed in the front direction of the cleaning apparatus 70, and a member having "R" put in a reference character is the member disposed in the back direction of the cleaning apparatus 70. Further, in FIGS. 2 and 3A, even in a case where a member having either one of "F" and "R" put in a reference character is only shown, while not shown, a member having the other ("R" or "F") put in a reference character is disposed.

As described above, the intermediate transfer belt 8 is wound around the stretching roller 12, serving as a rotary member, and is rotatably driven in an arrow B direction integrally with the stretching roller 12. The cleaning unit 20 removes the adhering matter such as the toner adhered onto the intermediate transfer belt 8 in a cleaning position C downstream of the secondary transfer nip T2 (refer to FIG. 1) in the arrow B direction.

The cleaning unit 20 includes pivot shafts 23F and 23R, a holding member 22 pivotably supported by the holding sheet metals 30F and 30R via the pivot shafts 23F and 23R, and a cleaning blade 21 held by the holding member 22. The holding member 22 is made of a sheet metal which is the metallic material, and the cleaning blade 21, serving as a blade, is made of material such as urethane rubber having elasticity.

The pivot shafts 23F and 23R are made of the metallic material, and swaged such that the holding member 22 is pivotably supported with respect to the holding sheet metals 30F and 30R around the pivot shafts 23F and 23R as the center. The pivot shafts 23F and 23R extend in an axial direction D1.

The pressure spring 24F, serving as an urging member, is stretched between the holding sheet metal 30F and a first end of the holding member 22 in the axial direction D1, and the pressure spring 24R is stretched between the holding sheet metal 30R and a second end of the holding member 22 in the axial direction D1. The pressure springs 24F and 24R urge the cleaning unit 20 in a direction in which the cleaning blade 21 approaches toward the intermediate transfer belt 8 around the pivot shafts 23F and 23R as a pivot axis.

Thereby, in the cleaning position C, the cleaning blade 21 comes into contact with a surface 8*a* of the intermediate transfer belt 8. By rotatably driving the intermediate transfer belt 8 in this state, the cleaning blade 21 is able to remove the adhering matter such as the toner adhered onto the surface 8*a* of the intermediate transfer belt 8. The adhering matter removed from the surface 8*a* of the intermediate transfer belt 8 by the cleaning blade 21 is conveyed to the collection container 80 by a conveyance unit, not shown, and stored in the collection container 80 (refer to FIG. 1), serving as a container.

Next, using FIGS. 3A and 3B, a configuration around the holding sheet metal 30F, serving as a support member, will be described more particularly. To be noted, since the cleaning apparatus 70 is disposed line-symmetrically with respect to a center line, extending in a direction orthogonal to the axial direction D1, of the cleaning apparatus 70, configurations around the holding sheet metals 30F and 30R are substantially the same. Therefore, the configuration around the holding sheet metal 30F will be mainly described, and descriptions of the configuration around the holding sheet metal 30R will be omitted herein.

Figure 3A:
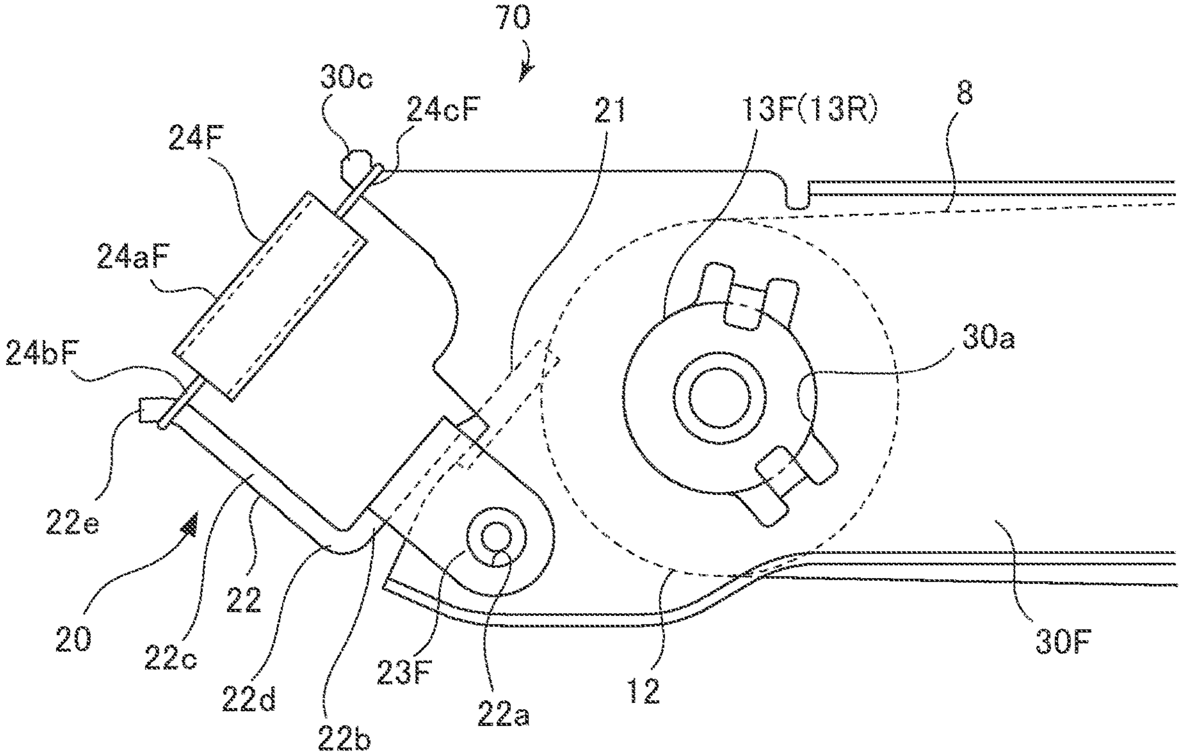
FIG. 3A is a front view showing the cleaning apparatus.
Figure 3B:
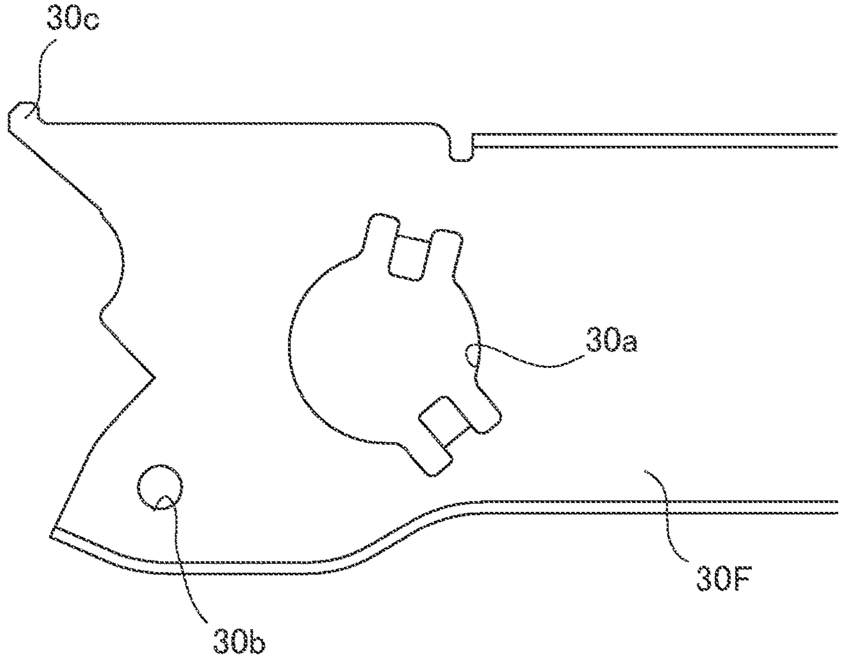
FIG. 3B is a front view showing a holding sheet metal.

As shown in FIG. 3B, the holding sheet metal 30F includes a first supporting hole portion 30*a*, serving as a first supporting portion, a second supporting hole portion 30*b*, serving as a second supporting portion, and a spring supporting portion 30*c*, serving as a third supporting portion. That is, the holding sheet metal 30F is configured as a single member. Further, since, as described above, the holding sheet metal 30F is made of the sheet metal which is the metallic material, the first supporting hole portion 30*a*, the second supporting hole portion 30*b*, and the spring supporting portion 30*c* are configured from the metallic material. Each of the first and second supporting hole portions 30*a* and 30*b* is a hole portion forming a through hole penetrating in the axis direction D1 (refer to FIG. 2). The first supporting hole portion 30*a* is disposed between the second supporting hole portion 30*b* and the spring supporting portion 30*c* in the vertical direction.

As shown in FIGS. 3A and 3B, the first supporting hole portion 30*a* of the holding sheet metal 30F supports a bearing 13F, and, similarly, the holding sheet metal 30R in the back direction supports a bearing 13R. The stretching roller 12 is rotatably supported by the bearings 13F and 13R.

The pivot shaft 23F is inserted into the second supporting hole portion 30*b* and a hole portion 22*a* formed in the holding member 22 of the cleaning unit 20, and both ends of the pivot shaft 23F are swaged in this state. Thereby, the cleaning unit 20 is pivotably supported with respect to the holding sheet metal 30F (30R) around the pivot shaft 23F (23R) as a pivot axis.

The holding member 22 of the cleaning unit 20 is bent into a substantially L-shape in a cross section, and includes a first portion 22*b* and a second portion 22*c*, which is coupled to the first portion 22*b* via a bent portion 22*d*. These first and second portions 22*b* and 22*c* extend in the axial direction D1. The pressure spring 24F is stretched between a first end 22*e* of the second portion 22*c* in the axial direction D1 and the spring supporting portion 30*c* of the holding sheet metal 30F. The pressure spring 24F is an extension coil spring, and includes a coil portion 24*a*F, a first end 24*b*F extending from the coil portion 24*a*F in a first direction and supported by the first end 22*e*, and a second end 24*c*F extending from the coil portion 24*a*F in a second direction and supported by the spring supporting portion 30*c*.

As described above, the holding sheet metal 30F includes the first supporting hole portion 30*a* supporting the intermediate transfer belt 8 via the bearing 13F and the stretching roller 12, the second supporting hole portion 30*b* supporting the cleaning unit 20, and the spring supporting portion 30*c* supporting the pressure spring 24F.

A relative position and pressing force of the cleaning blade 21 with respect to the intermediate transfer belt 8 are affected by positions of the intermediate transfer belt 8, the cleaning unit 20, and the pressure spring 24F, which are respectively supported by the first supporting hole portion 30*a*, the second supporting hole portion 30*b*, and the spring supporting portion 30*c* described above. In this embodiment, the holding sheet metal 30F is made of the metallic material having relatively high stiffness, and configured as the single member. Therefore, variations of the relative positions among the intermediate transfer belt 8, the cleaning unit 20, and the pressure spring 24F are decreased, and a variation of the pressing force of the cleaning blade 21 with respect to the intermediate transfer belt 8 is suppressed. With this configuration, it is possible to effectively perform the cleaning of the intermediate transfer belt 8. Thereby, it is possible to improve the cleaning performance of the cleaning apparatus 70.

Further, as shown in FIGS. 2 and 3B, the first and second supporting hole portions 30*a* and 30*b* and the spring supporting portion 30*c* are disposed on the same plane. More particularly, these first and second supporting hole portions 30*a* and 30*b* and spring supporting portion 30*c* are disposed on a plane orthogonal to a pivot axis L1 of the cleaning unit 20 extending in the axis direction D1. Therefore, it is possible to improve the accuracy of relative positional relationships among the first supporting hole portion 30*a*, the second supporting hole portion 30*b*, and the spring supporting portion 30*c*. Further, while the first end 22*e* of the holding member 22 supported by the spring supporting portion 30*c* and the second supporting hole portion 30*b* of the holding sheet metal 30F receives the elastic force of the pressure spring 24F, a direction of the elastic force of the pressure spring 24F is parallel to the abovementioned plane orthogonal to the pivot axis L1. Since the holding sheet metal 30F is hardly deformed by the stress whose direction is parallel to the abovementioned plane, it is possible to reduce the positional variations of the first supporting hole portion 30*a*, the second supporting hole portion 30*b*, and the spring supporting portion 30*c*. Therefore, the variations of the relative positions among the intermediate transfer belt 8, the cleaning unit 20, and the pressure spring 24F is decreased, and the variation of the pressing force of the cleaning blade 21 with respect to the intermediate transfer belt 8 is suppressed. With this configuration, it is possible to effectively perform the cleaning of the intermediate transfer belt 8. Thereby, it is possible to improve the cleaning performance of the cleaning apparatus 70.

Further, the holding member 22 of the cleaning unit 20 is formed symmetrically in the axis direction D1 with respect to the center of the cleaning blade 21 in the axis direction D1. As shown in FIG. 2, the holding member 22 includes the first and second portions 22*b* and 22*c*, and is formed in the L-shape so as to increase the stiffness against the bending stress in a direction orthogonal to the axial direction D1. Further, the second portion 22*c* is configured such that a width of a center portion 22*f* is larger than widths of both end portions 22*g* and 22*h*. Thereby, the stiffness of the holding member 22 against the bending stress in a direction orthogonal to the axial direction D1 is further increased. That is, the holding member 22 has the high stiffness against the elastic force from the pressure springs 24F and 24R, and hardly deforms. Further, the pressing force from the pressure springs 24F and 24R is substantially uniformly applied over the whole length of the cleaning blade 21 in the axial direction D1 via the holding member 22. With this configuration, it is possible to improve the cleaning performance of the cleaning blade 21 cleaning the intermediate transfer belt 8.

Further, the holding sheet metal 30F including the first and second supporting hole portions 30*a* and 30*b* and the spring supporting portion 30*c* is disposed as a separate body from the collection container 80. In other words, the first and second supporting hole portions 30*a* and 30*b* and the spring supporting portion 30*c* are not disposed in a member constituting the collection container 80. Therefore, a shape and the stiffness of the collection container 80 do not affect the cleaning performance of the cleaning apparatus 70. Thereby, it is possible to configure the collection container 80 inexpensively, and possible to reduce the cost.

Other Embodiments

To be noted, while, in this embodiment, the pressure springs 24F and 24R are configured from the extension coil spring, it is not limited to this. For example, it is acceptable to configure the pressure springs 24F and 24R from a compression coil spring, and configuring from the other kinds of springs such as a plate spring and a disc spring, an elastomer such as rubber, a magnet, and the like is also acceptable.

Further, in this embodiment, the cleaning apparatus 70 cleaning the intermediate transfer belt 8 is described in detail by using the intermediate transfer belt 8 as the image bearing member bearing the toner image. However, the cleaning apparatus 70 is not limited to the intermediate transfer belt 8, and it is acceptable to configure the cleaning apparatus 70 to remove, for example, an adhering matter on a surface of the photosensitive drum.

Further, while, in this embodiment, the cleaning unit 20 including the cleaning blade 21 is described as an example, it is not limited to this. For example, it is acceptable to apply this disclosure to a cleaning unit which collects the adhering matter adhered onto the surface 8*a* of the intermediate transfer belt 8 by a brush.

Further, while, in this embodiment, the stretching roller 12 is rotatably supported by the second supporting hole portion 30*b* via the bearings 13F and 13R, it is not limited to this. For example, by eliminating the bearings 13F and 13R, it is acceptable to directly support the stretching roller 12 by the second supporting hole portion 30*b*.

Further, while, in this embodiment, the cleaning unit 20 includes the pivot shafts 23F and 23R which are separate bodies from the holding member 22, it is not limited to this. For example, it is acceptable that the holding member 22 includes a shaft pivotably supported by the second supporting hole portion 30*b*. Further, it is acceptable that, the holding sheet metals 30F and 30R include a shaft, instead of the second supporting hole portion 30*b*, and pivotably support the holding member 22. That is, shapes of the first and second supporting hole portions 30*a* and 30*b* are not limited, and it is acceptable that the first and second supporting hole portions 30*a* and 30*b* are not the hole portions forming the through hole but, for example, shafts supporting the stretching roller 12 and the holding member 22.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-170001, filed Oct. 18, 2021, which is hereby incorporated by reference herein in its entirety.

What is claimed is:

1. A cleaning apparatus comprising:
- a belt configured to bear a toner image;
- a rotary member configured to rotate integrally with the belt, the belt being wound around the rotary member;
- a bearing configured to rotatably support the rotary member;
- a cleaning unit including:
  - a blade configured to come into contact with a surface of the belt and collect an adhering matter adhered onto the surface; and
  - a holding member configured to hold the blade;
- an urging member configured to urge the holding member such that the blade approaches the surface of the belt; and
- a support member configured from a single member and including a first supporting portion, a second supporting portion, and a third supporting portion, the first supporting portion rotatably supporting the belt via the bearing and the rotary member, the second supporting portion pivotably supporting the cleaning unit, the third supporting portion supporting the urging member.

2. The cleaning apparatus according to claim 1, wherein the first supporting portion, the second supporting portion, and the third supporting portion are disposed on a plane orthogonal to a pivot axis of the cleaning unit.

3. The cleaning apparatus according to claim 1, wherein each of the first supporting portion and the second supporting portion includes a hole portion forming a through hole.

4. The cleaning apparatus according to claim 1,
- wherein the blade has elasticity and is configured to come into contact with the belt, and
- wherein the holding member is configured to be pivotably supported by the second supporting portion.

5. The cleaning apparatus according to claim 1, wherein the urging member is a coil spring,
- wherein a first end of the urging member is connected to the holding member, and
- wherein a second end of the urging member is connected to the third supporting portion.

6. The cleaning apparatus according to claim 1, further comprising a container configured to store the adhering matter collected from the surface of the belt by the cleaning unit,
- wherein the first supporting portion, the second supporting portion, and the third supporting portion are not disposed in a member constituting the container.

7. The cleaning apparatus according to claim 1, wherein the first supporting portion is disposed between the second supporting portion and the third supporting portion in a vertical direction.

8. An image forming apparatus comprising:
- a belt configured to bear a toner image;
- a transfer unit configured to transfer the toner image formed on the belt onto a sheet;
- a rotary member configured to rotate integrally with the belt, the belt being wound around the rotary member;
- a bearing configured to rotatably support the rotary member;
- a cleaning unit including:
  - a blade configured to come into contact with a surface of the belt and collect an adhering matter adhered onto the surface; and
  - a holding member configured to hold the blade;
- an urging member configured to urge the holding member such that the blade approaches the surface of the belt; and
- a support member configured from a single member and including a first supporting portion, a second supporting portion, and a third supporting portion, the first supporting portion rotatably supporting the belt via the bearing and the rotary member, the second supporting portion pivotably supporting the cleaning unit, the third supporting portion supporting the urging member.

9. A cleaning apparatus comprising:
- an image bearing member configured to bear a toner image;
- a cleaning unit including:
  - a blade configured to come into contact with a surface of the image bearing member and collect an adhering matter adhered onto the surface; and
  - a holding member configured to hold the blade;
- an urging member configured to urge the holding member such that the blade approaches the surface of the image bearing member; and
- a support member configured from a single member and including a first supporting portion, a second supporting portion, and a third supporting portion, the first supporting portion rotatably supporting the image bearing member, the second supporting portion pivotably supporting the cleaning unit, the third supporting portion supporting the urging member.

10. The cleaning apparatus according to claim 9, wherein the first supporting portion, the second supporting portion, and the third supporting portion are disposed on a plane orthogonal to a pivot axis of the cleaning unit.

11. The cleaning apparatus according to claim 9, wherein each of the first supporting portion and the second supporting portion includes a hole portion forming a through hole.

12. The cleaning apparatus according to claim 9, wherein the blade has elasticity and is configured to come into contact with the image bearing member, and wherein the holding member is configured to be pivotably supported by the second supporting portion.

13. The cleaning apparatus according to claim 9, wherein the urging member is a coil spring, wherein a first end of the urging member is connected to the holding member, and wherein a second end of the urging member is connected to the third supporting portion.

14. The cleaning apparatus according to claim 9, further comprising a container configured to store the adhering matter collected from the surface of the image bearing member by the cleaning unit, wherein the first supporting portion, the second supporting portion, and the third supporting portion are not disposed in a member constituting the container.

15. The cleaning apparatus according to claim 9, wherein the first supporting portion is disposed between the second supporting portion and the third supporting portion in a vertical direction.

16. An image forming apparatus comprising:

an image bearing member configured to bear a toner image;

a transfer unit configured to transfer the toner image formed on the image bearing member onto a sheet;

a cleaning unit including:

a blade configured to come into contact with a surface of the image bearing member and collect an adhering matter adhered onto the surface; and a holding member configured to hold the blade;

an urging member configured to urge the holding member such that the blade approaches the surface of the image bearing member; and a support member configured from a single member and including a first supporting portion, a second supporting portion, and a third supporting portion, the first supporting portion rotatably supporting the image bearing member, the second supporting portion pivotably supporting the cleaning unit, the third supporting portion supporting the urging member.

17. The cleaning apparatus according to claim 1, wherein the urging member is not separated from the holding member.

18. The cleaning apparatus according to claim 9, wherein the urging member is not separated from the holding member.

19. The cleaning apparatus according to claim 1, wherein the holding member is made of sheet metal.

20. The cleaning apparatus according to claim 9, wherein the holding member is made of sheet metal.

* * * * *